United States Patent
Dussossoy et al.

(10) Patent No.: US 9,029,278 B2
(45) Date of Patent: May 12, 2015

(54) ALUMINO-BOROSILICATE GLASS FOR THE CONFINEMENT OF RADIOACTIVE LIQUID EFFLUENTS, AND METHOD FOR TREATING RADIOACTIVE LIQUID EFFLUENTS

(75) Inventors: Jean-Luc Dussossoy, Jacou (FR); Agnés Grandjean, Saint Marcel de Careiret (FR); Thierry Advocat, Avignon (FR); Nicolas Bousquet, Villevieille (FR); Sophie Schuller, Chusclan (FR)

(73) Assignee: Areva NC, Paris (FR)

( * ) Notice: Subject to any disclaimer, the term of this patent is extended or adjusted under 35 U.S.C. 154(b) by 109 days.

(21) Appl. No.: 13/142,248

(22) PCT Filed: Dec. 23, 2009

(86) PCT No.: PCT/EP2009/067901
§ 371 (c)(1),
(2), (4) Date: Aug. 30, 2011

(87) PCT Pub. No.: WO2010/076288
PCT Pub. Date: Jul. 8, 2010

(65) Prior Publication Data
US 2011/0306486 A1 Dec. 15, 2011

(30) Foreign Application Priority Data
Dec. 30, 2008 (FR) ...................... 08 59131

(51) Int. Cl.
*C03C 8/02* (2006.01)
*C03C 3/089* (2006.01)
*C03C 3/078* (2006.01)
*G21F 9/16* (2006.01)
*C03C 3/095* (2006.01)
*C03C 4/20* (2006.01)
*G21F 9/30* (2006.01)

(52) U.S. Cl.
CPC . *G21F 9/16* (2013.01); *C03C 3/089* (2013.01); *C03C 3/095* (2013.01); *C03C 4/20* (2013.01); *C03C 8/02* (2013.01); *G21F 9/305* (2013.01)

(58) Field of Classification Search
USPC .......... 501/14, 15, 21, 55, 64, 65, 66, 68, 69, 501/70, 71, 72
See application file for complete search history.

(56) References Cited

U.S. PATENT DOCUMENTS

| | | | |
|---|---|---|---|
| 4,367,012 A | 1/1983 | Ikeda et al. | |
| 4,534,893 A | 8/1985 | Dippel et al. | |
| 4,559,171 A | 12/1985 | Hayashi et al. | |
| 4,581,163 A | 4/1986 | Meininger et al. | |
| 5,075,263 A * | 12/1991 | Schittenhelm et al. | 501/25 |
| 5,195,393 A * | 3/1993 | Wolfington et al. | 74/502.5 |
| 6,624,103 B2 * | 9/2003 | Jantzen et al. | 501/72 |
| 7,341,964 B2 * | 3/2008 | Emlemdi | 501/26 |
| 2008/0020918 A1 * | 1/2008 | Chekhmir et al. | 501/66 |

FOREIGN PATENT DOCUMENTS

| | | |
|---|---|---|
| CA | 1230221 | 12/1987 |
| DE | 3204204 | 8/1983 |
| EP | 0088512 | 9/1983 |
| EP | 0155418 | 9/1985 |
| FR | 2525381 | 10/1983 |
| NL | 7907421 | 4/1980 |

OTHER PUBLICATIONS

Chapman et al. Vitrification of Hanford Wastes in a Joule-Heated Ceramic Melter and Evaluation of Resultant Canisterized Product. PNL-2904, Pacific Northwest Laboratory. Aug. 1979.*
Guillaumont, R., "Déchets Radioactifs—Gestion Institutionnelle et Opérationnelle," Les Techniques de l'Ingénieur, Référence BN3660, Jan. 2010, 32 pages (includes machine translation of abstract and English abstract as disclosed in specification of subject U.S. Appl. No. 13/142,248 at p. 6, lines 4 to 18).
Guillaumont, R., "Déchets Radioactifs—Gestion Institutionnelle et Opérationnelle," Les Techniques de l'Ingénieur, Référence BN3660, Jan. 2010, 32 pages (includes machine translation of abstract and English abstract as disclosed in specification of subject U.S. Appl. No. 13/142,428 at p. 6, lines 4 to 18).
French Search Report in French Application No. FR 0859131, dated Sep. 10, 2009.
International Search Report and Written Opinion in International Application No. PCT/EP2009/067901, mailed Jul. 2, 2010.
International Preliminary Report on Patentability in International Application No. PCT/EP2009/067901, dated Apr. 13, 2011.

* cited by examiner

Primary Examiner — Noah Wiese
(74) Attorney, Agent, or Firm — Nixon Peabody LLP

(57) ABSTRACT

An alumino-borosilicate glass for the confinement, isolation of a radioactive liquid effluent of medium activity, and a method for treating a radioactive liquid effluent of medium activity, wherein calcination of said effluent is carried out in order to obtain a calcinate, and a vitrification adjuvant is added to said calcinate.

16 Claims, No Drawings

ALUMINO-BOROSILICATE GLASS FOR THE CONFINEMENT OF RADIOACTIVE LIQUID EFFLUENTS, AND METHOD FOR TREATING RADIOACTIVE LIQUID EFFLUENTS

CROSS REFERENCE TO RELATED APPLICATIONS OR PRIORITY CLAIM

This application is a National Phase of PCT/EP2009/067901, filed Dec. 23, 2009, entitled, "ALUMINO-BOROSILICATE GLASS FOR CONFINING RADIOACTIVE LIQUID EFFLUENTS, AND METHOD FOR PROCESSING RADIOACTIVE EFFLUENTS", and which claims priority of, French Patent Application No. 08 59131, filed Dec. 30, 2008, the contents of which are incorporated herein by reference in their entirety.

The invention relates to an alumino-borosilicate glass for the confinement, containment, isolation of radioactive liquid effluents with medium activity especially effluents generated by operations for definitive shutdown (designated as MAD in French) of fuel cycle plants.

The invention also relates to a vitrification adjuvant, especially in the form of a glass frit or of a mixture of chemical products, especially of oxides, in the form of a powder.

The invention further relates to a method for treating radioactive liquid effluents of medium activity by calcination of these effluents, with view to obtaining a calcinate (calcine), by adding a vitrification adjuvant especially in the form of a glass frit or of a mixture of chemical products in the form of a powder to said calcinate, and melting of the calcinate and of the vitrification adjuvant in a cold crucible in order to obtain the alumino-borosilicate glass.

The technical field of the invention may generally be defined as that of the treatment of radioactive elements, and more particularly radioactive elements of medium activity, by confinement, containment, isolation, coating or immobilization.

These radioactive elements of medium activity are especially decontamination effluents generated by rinsing during operations for definitive shutdown ("MAD") of plants for reprocessing nuclear fuel.

The chemical composition of these decontamination effluents mainly depends on the different reagents used.

These reagents may be based on nitric acid or soda, or else in certain case these may be more specific effluents based on sodium carbonate or cerium nitrate.

Presently, radioactive effluents of medium activity such as the decontamination effluents mentioned above are essentially treated by bituminization or cementation.

The coating method by bituminization consists of hot mixing the waste as sludges (salts) with bitumen.

The obtained mixture is dehydrated and cast into a container where it is cooled.

The bitumen coating thus ensures homogeneous dispersion of the salts and immobilization (blocking) of the radionuclides within the matrix.

The bituminization method was developed in France as early as the 1960's for conditioning precipitation sludges resulting from the treatment of liquid effluents, and it was applied industrially.

It is a well proven method which benefits from a wide feedback of experience.

The bitumen was selected as a material for coating radioactive waste of low to medium radioactivity for its high agglomerating power, its high chemical inertia, its impermeability, its low solubility in water, its low application temperature, and its moderate cost.

On the other hand, bituminization has several major drawbacks:

the bitumen has reduced stability to irradiation, which causes swelling of the coated materials over time, especially because of the production of hydrogen by radiolysis;

in order to avoid any risk of fire, in the production phase of the coated materials, the operating range of the bituminization installations is quite limited. Indeed, during the manufacturing of the bituminous coated material, exothermic reactions may occur, and therefore they have to be controlled at the very best;

the mechanical strength of bitumens is very low because of their strong creep;

the volume of waste generated by this matrix is significant, taking into account the activity of the "MAD" effluents.

Cement, or more generally hydraulic binders are widely used in the nuclear industry. They are used for immobilizing solid waste of low and medium activity within containers or else they are used as a conditioning matrix for coating waste of medium activity.

Cementation is also used for coating waste in solution or in powdery form such as evaporation concentrates, sludges from chemical processing, ion exchange resins . . . .

Cements indeed combine many favorable properties for processing this type of waste, i.e. moderate costs, simplicity of application, good mechanical strength and, generally, stability over time.

In the case of cementation of liquid waste, the methods are most often continuous. Thus, for example, the cement and the waste are dosed separately and introduced into a kneader, and then the obtained mixture is then poured into a container.

Cementation however has two significant drawbacks:

after coating, the volume of the waste has doubled;

cement is an evolving material, and certain constituents of the waste and of the cement may interact. This may perturb hydration of the matrix and therefore affect the life expectancy of the obtained materials;

the waste has to be preprocessed for limiting its subsequent interactions with the cement.

Although various chemical compositions of hydraulic binders are presently under investigation in order to find a remedy to the aforementioned drawbacks, none of them is still totally satisfactory.

Moreover, vitrification methods are known (see especially "Les Techniques de l'Ingénieur", BN 3660-1 to BN 3660-31) which consist of incorporating into a glass with a suitable composition, all the elements contained in high activity effluents as well as the dissolution fines.

The main advantage of glasses comes from the fact that they are amorphous, which gives them outstanding remarkable properties but which also have drawbacks, i.e.;

the acceptable proportion of foreign elements by a glass is limited, and the load in the glass of calcinate from the calcination of the effluents, and of fines, generally remains quite small;

glasses are metastable materials.

But the main defect of the glass matrices is their sensitivity to chemical attacks, and the problems related to alteration by lixiviation of the glass matrices which are significant.

The sensitivity of glasses towards lixiviation is directly related to the presence of alkaline elements such as sodium, the departure of which by diffusion causes weakening of the glassy lattice.

In order to partially compensate for the detrimental role of sodium, boron is added to the silica glass in order to thereby provide glasses, so-called "borosilicate glasses".

Thus, a glass which is highly used in the vitrification of fission products (with high activity) from UOX1 fuels is the so-called R7T7 glass which is a borosilicate glass, the composition of which is the following: SiO 45%, $B_2O$ 14%, $Na_2O$ 10%, $Al_2O_3$ 5%, oxides of fission products, Zr, U, metal particles 13%, including platinoids ($RuO_2$, Rh, Pd), and the remainder of other Fe, Ni, Cr, Ca, Zn, P oxides.

As described in the "Techniques de l'Ingénieur", the industrial continuous vitrification process consists of feeding a melting pot or crucible heated by a medium frequency induction oven with the calcinate of the solutions of the fission products FP and of the glass frit.

The digestion takes place from 1,000 to 1,200° C. for a few hours and cylindrical 0.2 cubic meter containers are filled in two casts, released by a thermal valve. The calcinate is prepared by evaporating, by drying and calcining for example at 500° C. the solutions of fission products, the composition of which is suitably adjusted in a continuously fed rotary oven and heated by a resistor.

Packages of high activity waste ("HA") are thereby produced.

Glasses for confining, containing, isolating, radioactive liquid effluents of medium activity especially generated by "MAD" operations have never been described in the prior art.

Therefore as regards the foregoing, there therefore exists a need for a material allowing confinement of radioactive liquid effluents of medium activity, and especially effluents generated by operations for definitively shutting down nuclear fuel reprocessing plants, which does not have the drawbacks of bitumens and hydraulic binders as described above.

The goal of the present invention is i.e. to provide a material which meets this need, and which especially has great stability to irradiation, excellent mechanical strength, great resistance to chemical attacks, which is easy to apply, and which only undergoes a reduced volume increase after confinement, containment, isolation of the effluents.

The goal of the present invention is further to provide such a material for the confinement of radioactive liquid effluents which does not have the drawbacks, limitations, defects and disadvantages of the materials for confinement of radioactive liquid effluents of the prior art, and which overcomes the problems presented by these materials.

This goal and further other ones are, according to the invention, achieved by an alumino-borosilicate glass for the confinement, containment, isolation of a radioactive liquid effluent of medium activity, characterized in that it has the following composition expressed in percentages by mass based on the total mass of the glass:

a) $SiO_2$: 45 to 52
b) $B_2O_3$: 12 to 16.5
c) $Na_2O$: 11 to 15
d) $Al_2O_3$: 4 to 13
e) One or more ETR element(s) (Transition Elements) selected from oxides of transition elements such as $Fe_2O_3$, $Cr_2O_3$, $MnO_2$, $TcO_2$, and platinoids such as $RuO_2$, Rh, Pd: 0 to 5.25;
f) One or more TRA element(s) (Rare Earth) selected from rare earth oxides such as $La_2O_3$, $Nd_2O_3$, $Gd_2O_3$, $Pr_2O_3$, $CeO_2$, and from actinides oxides such as $UO_2$, $ThO_2$, $Am_2O_3$, $PuO_2$ $CmO_2$, $NpO_2$: 0 to 3.5;
g) $ZrO_2$: 0 to 4
h) Other elements AUT constitutive of the effluent: 0 to 4;
and in that the composition of the glass further meets the following inequations:

$$SiO_2+Al_2O_3<61\% \qquad (1)$$

$$71\%<SiO_2+B_2O_3+Na_2O<80.5\% \qquad (2)$$

$$B_2O_3/Na_2O>0.9 \qquad (3)$$

$$0.7\,Al_2O_3-ETR<5\% \qquad (4)$$

$$Al_2O_3/ETR>2.5 \qquad (5)$$

$$0.127(B_2O_3+Na_2O)>AUT. \qquad (6)$$

The $SiO_2$, $Al_2O_3$, $B_2O_3$, $Na_2O$, ETR, AUT, contents expressed as percentages by mass based on the total mass of the glass are entered into these inequations.

Advantageously, at least one of ETR, TRA and AUT is greater than 0. Preferably ETR is greater than 0.

Advantageously, ETR, TRA and AUT are all greater than 0.

Still preferably, the glass contains at the same time $Fe_2O_3$, $Cr_2O_3$, $MnO_2$, $TcO_2$, $RuO_2$, Rh, Pd, $La_2O_3$, $Nd_2O_3$, $Gd_2O_3$, $Pr_2O_3$, $CeO_2$, $UO_2$, $ThO_2$, $Am_2O_3$, $PuO_2CmO_2$, $NpO_2$, $SO_3$, $P_2O_5$, $MoO_3$, optionally BaO and optionally $ZrO_2$; i.e. the content of all these compounds is greater than 0.

Advantageously, when ETR is greater than 0, the glass contains $Fe_2O_3$ for example in an amount from 1 to 5% by mass, preferably from 2 to 4% by mass.

A glass suitable for the confinement, containment, isolation of radioactive liquid effluents of medium activity especially generated by "MAD" operations has never been described nor suggested in the prior art.

The glasses according to the invention lead to the manufacturing of standard containers for waste of type B which are totally distinguished from glass packages CSD-V prepared with the "R7T7 glass" as described above, not only by their chemical composition but also by their activity level (which is generally lower by a factor of 50 to 100 when compared to the R7T7 glass) and their intrinsic thermal power which is generally of about 2.5 kW for a CSD-V packet prepared from R7T7 glass.

The R7T7 glass matrices have allowed confinement, containment, isolation of high activity effluents but these matrices are precisely specifically adapted to the confinement of high activity effluents and it is found that they are not adapted to the confinement of radioactive liquid effluents of medium activity such as those generated by operations for definitively shutting down ("MAD") nuclear fuel reprocessing plants.

Indeed, specific problems are posed for the confinement of radioactive effluents of medium activity, and it was absolutely not obvious that the vitrification of radioactive waste, successfully applied with high activity radioactive waste, may be used with radioactive liquid effluents waste of medium activity, considering the specificity of the latter.

The teachings relating to vitrification of high activity effluents can by no means be directly transposed to the vitrification of effluents of medium activity.

Indeed, it was found that with the glass according to the invention, because of its very specific composition and of particular conditions which govern this composition, it was for the first time possible to confine radioactive liquid effluents of medium activity especially effluents generated by "MAD" operations.

By thereby allowing confinement of waste of medium activity in a glass, the invention gets rid of the drawbacks related to bituminization or to cementation and provides the confinement of waste, radioactive liquid effluents of medium activity, with all the advantages inherent to vitrification.

Further, the glass according to the invention may surprisingly be easily elaborated by a process of the calcination, cold crucible vitrification type, as already described above.

The glasses according to the invention actually have a specific composition range which imparts to the glass all the properties required for elaboration in a cold crucible and which ensures durable confinement, containment, isolation by very good resistance to lixiviation in the whole of this composition range.

In other words, the glass according to the invention not only meets the constraints of the contemplated vitrification process, and this in the whole of its composition range, but also the constraints related to lixiviation.

More specifically, the glass according to the invention may be elaborated in a range of temperatures from 1,200° C. to 1,300° C., which is perfectly compatible with vitrification by a cold crucible, and it further has a viscosity comprised between 20 dPa·s and 100 dPa·s (20 to 100 Poises), at the elaboration temperature, for example 1,250° C., and an electric resistance comprised between 2 and 10 Ω·cm at the elaboration temperature, for example 1,250° C., which meets the constraints of the vitrification process.

From the point of view of the resistance of the glass to lixiviation, the glass according to the invention, in the whole composition range defined above, meets the requirements with which a satisfactory long-term behavior may be ensured. Thus, its initial alteration (weathering) rate V0 is less than 10 $g·m^{-2}·d^{-1}$ at 100° C., preferably less than 5 $g·m^{-2}·d^{-1}$ at 100° C., and its equilibrium pH in a static test is less than 10, preferably less than 9.5 at 90° C.

Generally, the other elements constitutive of the effluent ("AUT") are selected from molybdate, phosphate and sulphate anions, and barium oxide BaO. In other words, the other elements are generally selected from the following oxides: $SO_3$, $P_2O_5$, $MoO_3$, BaO.

The glasses according to the invention are elaborated from a specific vitrification adjuvant containing the following oxides: $SiO_2$, $B_2O_3$, $Na_2O$, $Al_2O_3$, $ZrO_2$, CaO, $Li_2O$, $Fe_2O_3$, NiO and CoO in specific proportions, this vitrification adjuvant being added to the calcinate (calcine) produced by calcination of the liquid effluents of medium activity to be treated so as to have a glass composition located with, in the composition range, a calcination adjuvant also called a "dilution adjuvant" may further be added to the effluent beforehand in the solution or during calcination.

Thus, the invention further relates to a vitrification adjuvant characterized in that it has the following composition, expressed in percentages by mass:

$SiO_2$: 58 to 65%
$B_2O_3$: 15 to 19%
$Na_2O$: 5 to 10%
$Al_2O_3$: 0 to 3%
$Li_2O$: 1 to 4%
CaO: 1.5 to 4%
$ZrO_2$: 0 to 3%
$Fe_2O_3$: 2 to 4%
NiO: 0 to 2%
CoO: 0 to 2%

An exemplary composition of this adjuvant is given below, also expressed in percentages by mass:

$SiO_2$: 62.85%
$B_2O_3$: 17.12%
$Na_2O$: 7.50%
$Al_2O_3$: 1.00%
$Li_2O$: 2.71%
CaO: 3.87%
$ZrO_2$: 1.25%
$Fe_2O_3$: 3.00%
NiO: 0.35%
CoO: 0.35%

The vitrification adjuvant may be in the form of a glass frit comprising the aforementioned specific oxides or else of a mixture of chemical products, especially of oxides, in the form of powders.

Preferably, the vitrification adjuvant is in the form of a glass frit.

This specific glass frit has a composition with which it is possible to obtain a glass in the composition range according to the invention, especially from any radioactive liquid effluent, the average, minimum, and maximum composition of which is found in the ranges defined further on.

However, the chemical composition of the vitrification adjuvant may be modified depending on the variation of the contents of chemical elements of the liquid effluent to be treated.

The invention also relates to a method for treating a radioactive liquid effluent of medium activity, wherein calcination of said effluent, to which is optionally added a calcination adjuvant is carried out, in order to obtain a calcinate, and a vitrification adjuvant is then added to said calcinate, it is proceeded with melting of said calcinate and of said vitrification adjuvant in a cold crucible in order to obtain a glass melt, and said glass melt is then cooled down, whereby the alumino-borosilicate glass as defined above is obtained.

The method according to the invention is particularly suitable for the treatment of a radioactive liquid effluent of medium activity which contains the following elements in the following contents:

Na: from 30 g/L to 80 g/L
B: from 0 g/L to 5 g/L
Mn: from 0 g/L to 1 g/L
Ce: from 0 g/L to 14 g/L
Fe: from 0 g/L to 3 g/L
Ni: from 0 g/L to 1 g/L
Cr: from 0 g/L to 1 g/L
Zr: from 0 g/L to 16 g/L
Mo: from 0 g/L to 10 g/L
P: from 0 g/L to 4 g/L
S: from 0 g/L to 1.7 g/L
Ba: from 0 g/L to 7 g/L
Gd: from 0 g/L to 1 g/L
Tc: 1 g/L or less
Actinides: from 0 g/L to 8 g/L
Platinoids: 1 g/L or less;
the total content of said elements being from 30 g/L to 154.7 g/L.

Let us specify that the specified contents above are actually elemental contents.

The liquid effluent above is defined by a composition range expressed by minimum and maximum contents of each of the elements as well as by total minimum and maximum contents.

Within these ranges, it is possible to define so-called reference contents thereby defining a reference composition also corresponding to a reference effluent which is the effluent of the medium activity type which may be treated by the method according to the invention in order to provide a glass having the whole of the advantageous properties listed above.

This so-called "reference" radioactive liquid effluent contains the following elements in the following so-called "average" or "reference" contents:

Na: 55 g/L
B: 2.5 g/L
Mn: 0.5 g/L
Ce: 7 g/L
Fe: 1.5 g/L
Ni: 0.5 g/L

Cr: 0.5 g/L
Zr: 8 g/L
Mo: 5 g/L
P: 2 g/L
S: 0.85 g/L
Ba: 3.5 g/L
Gd: 0.5 g/L
Tc: 1 g/L
Actinides: 4 g/L
Platinoids: 1 g/L;
the total content of said elements being 93.35 g/L.

The composition range of the borosilicate glassy conditioning matrix according to the invention is particularly suitable for the radioactive effluents mentioned above. Within the range of the composition of the glass matrices according to the invention, the physico-chemical properties of these matrices are such that at high temperature, it is possible to elaborate them with a method of the calcination vitrification type.

Advantageously, the vitrification adjuvant is as defined above.

Generally the melting of the calcinate stemming from the calcination of the effluent and of the optional calcination, dilution adjuvants, and of the vitrification adjuvant is carried out at a temperature from 1,200° C. to 1,300° C., preferably 1,250° C.

The invention will now be described in detail in the following description, given as an illustration and not as a limitation, more particularly in connection with the method for treating radioactive effluents of medium activity.

The radioactive liquid effluent of medium activity which may be treated by the method according to the invention may especially be a nitric aqueous effluent containing nitrates of metals or metalloids.

The effluent treated by the method according to the invention will generally have the composition as already specified above.

The method according to the invention includes two main steps.

The first step is a step for calcination of the effluent during which evaporation, drying and then calcination, denitration of a portion of the nitrates if the effluent contains any of them, occur.

It may be noted that the salts of the effluent generally consist in a very large majority of nitrates or hydroxides which are decomposed in the calciner.

The second step is a vitrification step by dissolution in a confinement glass of the calcinate produced during the calcination step.

The calcination step is generally carried out in a rotating tube heated for example to a temperature of about 400° C. by an electric oven. The solid calcinate is milled by a loose bar placed inside the rotating tube heated to the intended temperature.

During the calcination of certain solutions, in particular solutions rich in sodium nitrate, in other words solutions with high sodium content in a nitric medium, adhesion of the calcinate on the walls of the rotating tube may be observed, which may lead to total blocking of the tube of the calciner.

The answer consists of adding to the effluent at least one compound supposed to be non-tacky called a dilution adjuvant or calcination adjuvant, such as aluminium nitrate, iron nitrate, zirconium nitrate, rare earth nitrates, or mixtures thereof in order to allow their calcination while avoiding clogging of the calciner.

Preferably according to the invention, an adjuvant consisting of a mixture of aluminium nitrate and of iron nitrate, preferably in a proportion of $0.66 < Al_2O_3/(Al_2O_3 + Fe_2O_3) < 1$ wherein the contents are oxide mass contents, is used as a calcination adjuvant.

Further, the ratio of $Na_2O$ to the sum of the oxides in the calcinate is generally less than or equal to 0.3.

The treatment method according to the invention comprises after the calcination step a step for vitrifying the calcinate. This vitrification step consists of dissolving the calcinate in a confinement glass.

For this purpose, a vitrification adjuvant comprising the following oxides: $SiO_2$, $B_2O_3$, $Na_2O$, $Al_2O_3$, $ZrO_2$, $CaO$, $Li_2O$, $Fe_2O_3$, $NiO$ and $CoO$, is added to the calcinate stemming from the calcination of the effluent to which a dilution adjuvant was optionally added. This vitrification adjuvant generally comprises the aforementioned oxides in specific proportions for obtaining a glass in the composition range of the invention, depending on the composition of the effluent.

This vitrification adjuvant is generally as defined above.

The vitrification adjuvant may be in the form of a mixture of powders, or else in the form of a glass frit including the oxides.

It is generally advantageous to use a glass frit which requires less melting energy than the mixture of powders.

The vitrification adjuvant is added to a defined amount of the calcinate so as to observe the composition range defined above and it is proceeded with the melting of the whole. According to the invention, the glass melt obtained has physico-chemical properties, i.e. viscosity as well as resistivity properties which make it totally suitable for vitrification by a cold crucible.

The glass is elaborated at a temperature generally from 1,200° C. to 1,300° C., for example 1,250° C. in a cold crucible heated by induction. The glass is homogenized in the crucible by mechanical mixing and/or bubbling, when the upper level of the oven is attained, a cast of glass is carried out in a container, the amount of cast glass is for example of the order of 200 kg.

It is then proceeded with cooling of the glass melt in order to obtain the glass according to the invention which is an alumino-borosilicate glass with high chemical durability, having the advantageous properties mentioned above and meeting the criteria defined above.

The invention will now be described with reference to the following examples, given as an illustration and not as a limitation:

EXAMPLES

Three compositions of radioactive liquid effluents of medium activity stemming from "MAD" operations will be treated below:

the aforementioned reference solution is vitrified with the reference glass frit, by seeking a rated, nominal, waste incorporation level of 12% (Example 1);

a sodium-rich solution is treated with a vitrification adjuvant in the form of a frit (Example 2);

a low-sodium solution is treated with a vitrification adjuvant in the form of powders (Example 3).

The selection of the frits or adjuvants is dictated by optimization of the incorporation level of waste.

All the glasses have to be contained within the composition range mentioned above.

Example 1

| Composition of the waste in elements | Composition of the waste in oxide percent |
|---|---|
| Na: 55 g/L | $Na_2O$ = 56.42% |
| B: 2.5 g/L | $B_2O_3$ = 6.13% |
| Mn: 0.5 g/L | $MnO_2$ = 0.60% |
| Ce: 7 g/L | $Ce_2O_3$ = 6.24% |
| Fe: 1.5 g/L | $Fe_2O_3$ = 1.63% |
| Ni: 0.5 g/L | NiO = 0.48% |
| Cr: 0.5 g/L | $Cr_2O_3$ = 0.56% |
| Zr: 8 g/L | $ZrO_2$ = 8.23% |
| Mo: 5 g/L | $MoO_3$ = 5.71% |
| P: 2 g/L | $P_2O_5$ = 3.49% |
| S: 0.85 g/L | $SO_3$ = 1.61% |
| Ba: 3.5 g/L | BaO = 2.97% |
| Gd: 0.5 g/L | $Gd_2O_3$ = 0.46% |
| Tc: 1 g/L | $TcO_2$ = 1.01% |
| Actinides: 4 g/L | Actinide oxides = 3.45% |
| Platinoids: 1 g/L | Platinoids = 1.00% |

The solution is too rich in sodium oxide for being calcined in this condition, and it is necessary to add a vitrification adjuvant in order to meet the calcination criterion: $Na_2O$/(sum of the oxides in the calcinate) ratio equal to 0.3.

It is necessary to add aluminium and iron nitrate in order to reduce the amount of sodium in the calcinate.

In this case, for 100 g of calcinate, it is necessary to add the equivalent of 88.07 g of alumina and iron oxide in order to obtain a calcinable solution.

On the other hand, the constraints of the vitrifiable range imposes for a waste level of 12% a $Al_2O_3/(Al_2O_3+Fe_2O_3)$ ratio provided by the calcination adjuvant of greater than or equal to 0.91.

The calcinate is brought to a temperature of about 400° C.

The composition of the calcinate in percent by mass is given below.

$Na_2O$=30.00%
$B_2O_3$=3.26%
$Al_2O_3$=42.61%
$MnO_2$=0.32%
$Ce_2O_3$=3.32%
$Fe_2O_3$=5.08%
NiO=0.26%
$Cr_2O_3$=0.30%
$ZrO_2$=4.37%
$MoO_3$=3.04%
$P_2O_5$=1.85%
$SO_3$=0.86%
BaO=1.58%
$Gd_2O_3$=0.25%
$TcO_2$=0.54%
Actinide oxides=1.84%
Platinoids=0.53%

A 12% incorporation level imposes, with the reference frit, the addition of 77.43% of frit and 32.57% of calcinate in order to obtain the final glass. The elaboration temperature is 1,220° C.

$SiO_2$=48.66%
$Na_2O$=12.58%
$B_2O_3$=13.99%
$Al_2O_3$=10.39%
CaO=3.00%
$Li_2O$=2.10%
$MnO_2$=0.07%
$Ce_2O_3$=0.75%
$Fe_2O_3$=3.47%
NiO=0.33%
CoO=0.27%
$Cr_2O_3$=0.07%
$ZrO_2$=1.96%
$MoO_3$=0.69%
$P_2O_5$=0.42%
$SO_3$=0.19%
BaO=0.36%
$Gd_2O_3$=0.06%
$TcO_2$=0.12%
Actinide oxides=0.41%
Platinoids=0.12%

Example 2

In this example, a sodium-rich solution is treated by calcination-vitrification with use of a frit.

| Composition of the waste in elements | Composition of the waste in oxide percent |
|---|---|
| Na: 80 g/L | $Na_2O$ = 65.31% |
| B: 2.5 g/L | $B_2O_3$ = 4.88% |
| Mn: 0.5 g/L | $MnO_2$ = 0.48% |
| Ce: 7 g/L | $Ce_2O_3$ = 4.97% |
| Fe: 1.5 g/L | $Fe_2O_3$ = 1.30% |
| Ni: 0.5 g/L | NiO = 0.39% |
| Cr: 0.5 g/L | $Cr_2O_3$ = 0.44% |
| Zr: 8 g/L | $ZrO_2$ = 6.55% |
| Mo: 5 g/L | $MoO_3$ = 4.54% |
| P: 2 g/L | $P_2O_5$ = 2.77% |
| S: 0.85 g/L | $SO_3$ = 1.28% |
| Ba: 3.5 g/L | BaO = 2.37% |
| Gd: 0.5 g/L | $Gd_2O_3$ = 0.37% |
| Tc: 1 g/L | $TcO_2$ = 0.80% |
| Actinides: 4 g/L | Actinide oxides = 2.75% |
| Platinoids: 1 g/L | Platinoids = 0.80% |

The solution is too rich in sodium oxide for being calcined as it stands, it is necessary to add a vitrification adjuvant in order to meet the calcination criterion: $Na_2O$/(sum of the oxides in the calcinate) ratio equal to 0.3.

It is necessary to add aluminium and iron nitrate in order to reduce the amount of sodium in the calcinate.

In this case, for 100 g of calcinate, it is necessary to add the equivalent of 117.71 g of alumina and iron oxide in order to obtain a calcinable solution.

On the other hand, the constraints of the vitrifiable range impose for a waste level of 12%, an $Al_2O_3/(Al_2O_3+Fe_2O_3)$ ratio provided by the calcination adjuvant of greater than or equal to 0.85.

The calcinate is brought to a temperature of about 400° C.

The composition of the calcinate in percent by mass is given below:

$Na_2O$=30.00%
$B_2O_3$=2.24%
$Al_2O_3$=44.88%
$MnO_2$=0.22%
$Ce_2O_3$=2.28%
$Fe_2O_3$=9.79%
NiO=0.18%
$Cr_2O_3$=0.20%
$ZrO_2$=3.01%
$MoO_3$=2.09%
$P_2O_5$=1.27%
$SO_3$=0.59%

BaO=1.09%
Gd$_2$O$_3$=0.17%
TcO$_2$=0.37%
Actinide oxides=1.26%
Platinoids: =0.37%

In this case, the waste load level is limited by the acceptable alumina content in the glass i.e. 13%.

The maximum load level is 12.56%, obtained with the reference frit by adding 72.65% of frit and 27.35% of calcinate in order to obtain the final glass. The elaboration temperature is 1,250° C. The composition of the glass is the following:
SiO$_2$=45.65%
Na$_2$O=13.65%
B$_2$O$_3$=13.05%
Al$_2$O$_3$=13.00%
CaO=2.81%
Li$_2$O=1.97%
MnO$_2$=0.06%
Ce$_2$O$_3$=0.62%
Fe$_2$O$_3$=4.86%
NiO=0.33%
CoO=0.25%
Cr$_2$O$_3$=0.06%
ZrO$_2$=1.74%
MoO$_3$=0.57%
P$_2$O$_5$=0.35%
SO$_3$=0.16%
BaO=0.30%
Gd$_2$O$_3$=0.05%
TcO$_2$=0.10%
Actinide oxides=0.35%
Platinoids=0.10%

Example 3

In this example, a low-sodium solution is treated by calcination-vitrification with use of a frit.

| Composition of the waste in elements | Composition of the waste in oxide percent |
|---|---|
| Na: 40 g/L | Na$_2$O = 48.49% |
| B: 2.5 g/L | B$_2$O$_3$ = 7.25% |
| Mn: 0.5 g/L | MnO$_2$ = 0.71% |
| Ce: 7 g/L | Ce$_2$O$_3$ = 7.37% |
| Fe: 1.5 g/L | Fe$_2$O$_3$ = 1.93% |
| Ni: 0.5 g/L | NiO = 0.57% |
| Cr: 0.5 g/L | Cr$_2$O$_3$ = 0.66% |
| Zr: 8 g/L | ZrO$_2$ = 9.72% |
| Mo: 5 g/L | MoO$_3$ = 6.75% |
| P: 2 g/L | P$_2$O$_5$ = 4.12% |
| S: 0.85 g/L | SO$_3$ = 1.91% |
| Ba: 3.5 g/L | BaO = 3.51% |
| Gd: 0.5 g/L | Gd$_2$O$_3$ = 0.55% |
| Tc: 1 g/L | TcO$_2$ = 1.19% |
| Actinides: 4 g/L | Actinide oxides = 4.08% |
| Platinoids: 1 g/L | latinoids = 1.18% |

The solution is too rich in sodium oxide for being calcined as it stands, it is necessary to add a vitrification adjuvant in order to meet the calcination criterion: Na$_2$O/(sum of the oxides in the calcinate) ratio equal to 0.3.

It is necessary to add aluminium and iron nitrate in order to reduce the amount of sodium in the calcinate.

In this case for 100 g of calcinate, it is necessary to add the equivalent of 61.64 g of alumina and iron oxide in order to obtain a calcinable solution.

On the other hand, the constraints of the vitrifiable range impose an Al$_2$O$_3$/(Al$_2$O$_3$+Fe$_2$O$_3$) ratio provided by the calcination adjuvant of greater than or equal to 0.85.

The calcinate is brought to a temperature of about 400° C.

The load level in Example 3 is limited by the amount of silica stemming from the glass frit.

The composition of the powder mixture may be optimized in order to obtain the maximum waste incorporation level.

An adjuvant composition meeting the criteria of the composition range is the following:
  67.5% of SiO$_2$ in the form of fine sand;
  19.8% of B$_2$O$_3$ in the form of granulated boric acid (H$_3$BO$_3$);
  3% Na$_2$O in the form of sodium carbonate or in the solution of the form of sodium nitrate;
  4% CaO in the form of wollastonite (CaSiO$_3$);
  2% Fe$_2$O$_3$ in the form of FeO;
  0.25% NiO in the form of NiO;
  0.45% CoO in the form of CoO.

The maximum incorporation level is attained when the silica limit is attained i.e. 66.67% of powders for 33.33% of calcinate, which corresponds to a waste load level of 20.62%. The elaboration temperature is 1,200° C.

The chemical forms of the different adjuvants are given as examples and may be replaced with other products.

The glass composition is the following:
SiO$_2$=45.00%
Na$_2$O=12.00%
B$_2$O$_3$=14.69%
Al$_2$O$_3$=10.80%
CaO=2.67%
Li$_2$O=2.00%
MnO$_2$=0.15%
Ce$_2$O$_3$=1.52%
Fe$_2$O$_3$=3.64%
NiO=0.28%
CoO=0.30%
Cr$_2$O$_3$=0.14%
ZrO$_2$=2.00%
MoO$_3$=1.39%
P$_2$O$_5$=0.85%
SO$_3$=0.39%
BaO=0.72%
Gd$_2$O$_3$=0.11%
TcO$_2$=0.25%
Actinide oxides=0.84%
Platinoids=0.24%.

The invention claimed is:

1. A method for treating a radioactive liquid effluent of medium activity, wherein calcination of said effluent, to which is optionally added a calcination adjuvant, is carried out in order to obtain a calcinate, and a vitrification adjuvant for producing an alumino-borosilicate glass is then added to said calcinate, the vitrification adjuvant having the following composition expressed in percentages by mass:
  SiO$_2$: 58 to 65
  B$_2$O$_3$: 15 to 19
  Na$_2$O: 5 to 10
  Al$_2$O$_3$: 0 to 3
  Li$_2$O: 1 to 4
  CaO: 1.5 to 4
  ZrO$_2$: 0 to 3
  Fe$_2$O$_3$: 2 to 4
  NiO: 0 to 2
  CoO: 0 to 2,
it is proceeded with the melting of said calcinate and of said vitrification adjuvant in a cold crucible in order to obtain a glass melt, and said glass melt is then cooled down, whereby the alumino-borosilicate glass is obtained having the following composition expressed in percentages by mass based on the total mass of the glass:
  a) $SiO_2$: 45 to 52
  b) $B_2O_3$: 12 to 16.5
  c) $Na_2O$: 11 to 15
  d) $Al_2O_2$: 4 to 13
  e) one or more element(s) ETR selected from oxides of transition elements and platinoids: where ETR is in the range of >0 to 5.25;
  f) One or more element(s) TRA selected from rare earth oxides and from actinides oxides: where TRA is in the range of 0 to 3.5;
  g) $ZrO_2$: 0 to 4
  h) Other elements AUT of the effluent: where AUT is in the range of 0 to 4;
  and the composition of the glass further satisfies all of the following inequations in which the $SiO_2$, $Al_2O_3$, $B_2O_3$, $Na_2O$, ETR, AUT are expressed in percentages by mass based on the total mass of the glass:

$$SiO_2 + Al_2O_3 < 61\% \tag{1}$$

$$71\% < SiO_2 + B_2O_3 + Na_2O < 80.5\% \tag{2}$$

$$B_2O_3/Na_2O > 0.9 \tag{3}$$

$$0.7\, Al_2O_3 - ETR < 5\% \tag{4}$$

$$Al_2O_3/ETR > 2.5 \tag{5}$$

$$0.127(B_2O_3 + Na_2O) > AUT. \tag{6}$$

2. The method according to claim 1, wherein the other elements constitutive of the effluent ("AUT") are selected from the following oxides: $SO_3$, $P_2O_5$, $MoO_3$, and BaO.

3. The method according to claim 1, wherein the vitrification adjuvant is characterized in that it is in the form of a glass frit.

4. The method according to claim 1, wherein the vitrification adjuvant is characterized in that it is in the form of a mixture of chemical products, especially of oxides, in the form of powders.

5. The method according to claim 1, wherein the radioactive liquid effluent of medium activity contains the following elements in the following contents:
  Na: from 30 g/L to 80 g/L
  B: from 0 g/L to 5 g/L
  Mn: from 0 g/L to 1 g/L
  Ce: from 0 g/L to 14 g/L
  Fe: from 0 g/L to 3 g/L
  Ni: from 0 g/L to 1 g/L
  Cr: from 0 g/L to 1 g/L
  Zr: from 0 g/L to 16 g/L
  Mo: from 0 g/L to 10 g/L
  P: from 0 g/L to 4 g/L
  S: from 0 g/L to 1.7 g/L
  Ba: from 0 g/L to 7 g/L
  Gd: from 0 g/L to 1 g/L
  Tc: 1 g/L or less
  Actinides: from 0 g/L to 8 g/L
  Platinoids: 1 g/L or less;
  the total content of said elements being from 30 g/L to 154.7 g/L.

6. The method according to claim 5, wherein the radioactive liquid effluent contains the following elements in the following contents:
  Na: 55 g/L
  B: 2.5 g/L
  Mn: 0.5 g/L
  Ce: 7 g/L
  Fe: 1.5 g/L
  Ni: 0.5 g/L
  Cr: 0.5 g/L
  Zr: 8 g/L
  Mo: 5 g/L
  P: 2 g/L
  S: 0.85 g/L
  Ba: 3.5 g/L
  Gd: 0.5 g/L
  Tc: 1 g/L
  Actinides: 4 g/L
  Platinoids: 1 g/L;
  the total content of said elements being 93.35 g/L.

7. The method according to claim 1, wherein the calcination adjuvant is selected from aluminium nitrate, iron nitrate, zirconium nitrate, rare earth nitrates, and mixtures thereof.

8. The method according to claim 7, wherein the calcination adjuvant is a mixture of aluminium nitrate and of iron nitrate.

9. The method according to claim 5, wherein the $Na_2O$/(sum of the oxides in the calcinate) ratio is less than or equal to 0.3.

10. The method according to claim 5, wherein the vitrification adjuvant is as defined in any one of claims 4 to 5.

11. The method according to claim 5, wherein the melting of the calcinate and of the vitrification adjuvant is carried out a temperature from 1,200° C. to 1,300° C. preferably 1,250° C.

12. The method according to claim 1 wherein the oxides of transition elements are selected from $Fe_2O_3$, $Cr_2O_3$, $MnO_2$, and $TcO_2$.

13. The glass according to claim 1 wherein the platinoids are selected from $RuO_2$, Rh, and Pd.

14. The method according to claim 1 wherein the rare earth oxides are selected from $La_2O_3$, $Nd_2O_3$, $Gd_2O_3$, $Pr_2O_3$, and $CeO_2$.

15. The method according to claim 1 wherein the actinides oxides are selected from $UO_2$, $ThO_2$, $Am_2O_3$, $PuO_2 CmO_2$, $NpO_2$.

16. The method according to claim 8, wherein the calcination adjuvant mixture of aluminium nitrate and of iron nitrate has the following proportions relating to the contents: $0.66 < Al_2O_3/(Al_2O_3 + Fe_2O_3) < 1$ wherein the contents are oxide contents by mass.

* * * * *